(No Model.)
G. M. CUSTER.
COMBINED WHIP SOCKET AND REIN HOLDER.
No. 311,876. Patented Feb. 10, 1885.
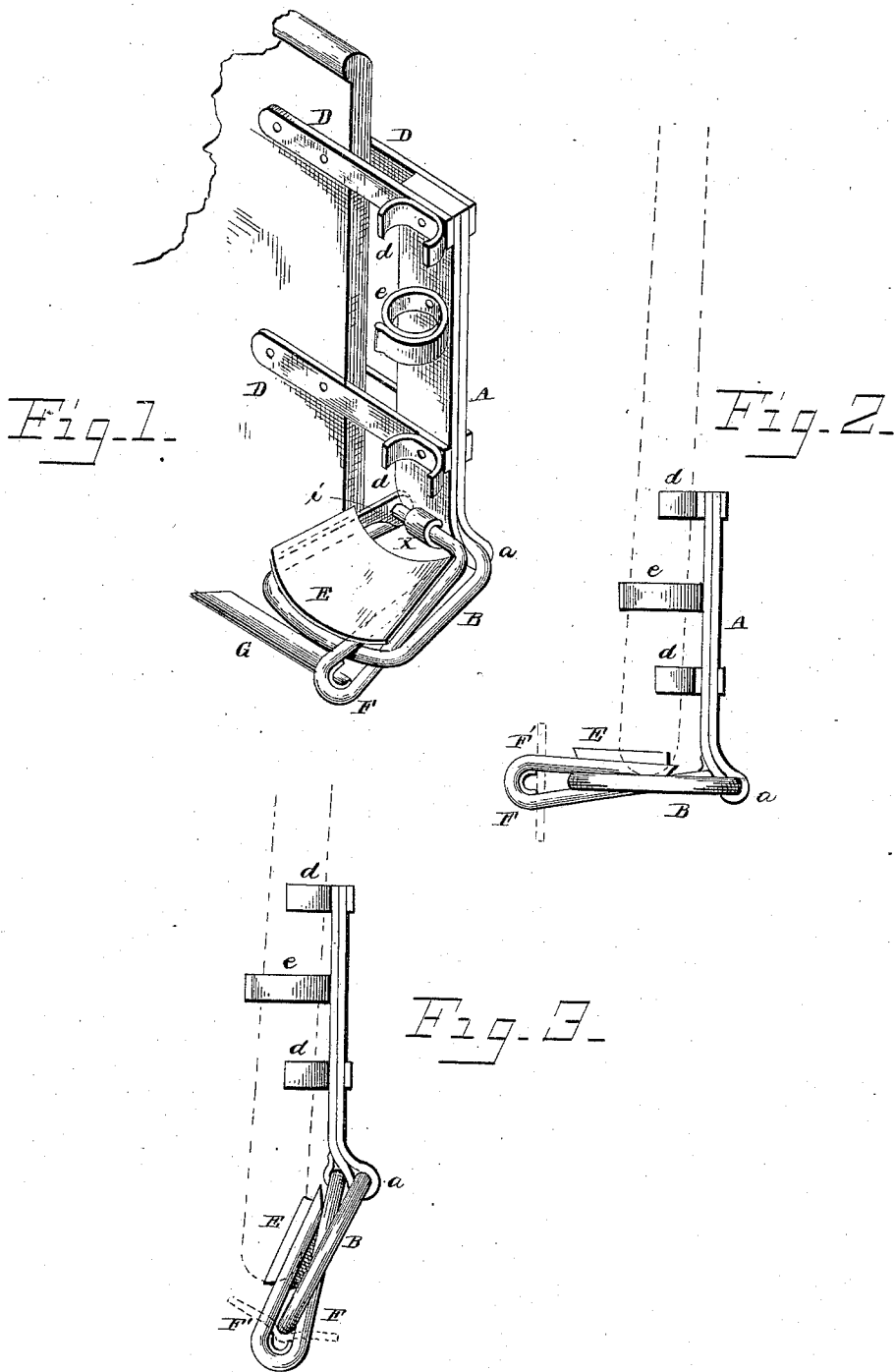
WITNESSES
INVENTOR

UNITED STATES PATENT OFFICE.

GEORGE M. CUSTER, OF TERRE HAUTE, INDIANA.

COMBINED WHIP-SOCKET AND REIN-HOLDER.

SPECIFICATION forming part of Letters Patent No. 311,876, dated February 10, 1885.

Application filed June 18, 1884. (No model.)

*To all whom it may concern:*

Be it known that I, GEORGE M. CUSTER, a citizen of the United States, residing at Terre Haute, in the county of Vigo and State of Indiana, have invented certain new and useful Improvements in Whip-Sockets and Rein-Holders, of which the following is a specification, reference being had therein to the accompanying drawings.

My invention relates to whip-sockets and rein-holders combined, and the object I have in view is to compress the lines in the holder A, after they have been once inserted, by simply pressing the whip down into its socket, as will be hereinafter more particularly described.

In the accompanying drawings, making part of this specification, Figure 1 represents a perspective of my device connected to a dash-board of a vehicle, and Figs. 2 and 3 are side views showing the parts in different positions.

In the figures, A represents a metallic plate, which is doubled, so as to form an eye, $a$, at its center. A metallic loop, B, is caught in this eye and turns freely therein.

D D represent arms which are pivoted or riveted to the plate A and then to the dash-board of the vehicle. The same rivet secures the half-rings $d\ d$ to the arms and plate.

$e$ represents a band-ring which is riveted centrally between the half-rings $d\ d$ to the plate A.

$x$ represents an eye secured to the plate on the opposite side from the eye $a$.

F represents a metallic rod, one end of which rests in the eye $x$. The other is then bent at a right angle and toward the free end of loop B. It passes around this loop and beneath an apron, E, to which it is secured. To the end of rod F, near eye $x$, is secured an arm, $i$, which passes beneath the apron E, and is secured to it.

In the bend of rod F where it passes around the loop B is secured one end of a trough, G, the free end of which is beveled, as represented. The radii of the loop or link B and the bar F being different in length, it will be seen that when they perform a partial revolution their outer sides or ends approach or recede from each other, according to the direction in which they are moved. If they are moved upward, they recede, but if downward they approach each other.

In using this device as a line-holder, the loop and bar and apron are raised, which separates the trough G sufficiently from the loop B to allow the lines to pass between them. The whip is then pressed down in the socket formed by the half-rings and ring $e$, and its butt resting upon the apron E causes it to move downward with the parts to which it is connected, and thus clamp the lines in the trough between it and the loop B.

The lines may be moved out endwise of the trough, but will only pull tighter should the horse pull on them.

This is a very simple and easily operated device, and one which can be given to the public very cheaply.

Having thus fully described my invention, what I claim as new, and desire to secure by Letters Patent, is—

The plate A, connected to the dasher, and provided with a whip-socket, and having eyes formed upon or connected to it, to which are hinged the loop B and a bar, F, said bar carrying an apron and a trough or arm, G, the loop and bar operating in such manner when their free ends are moved upward or downward as to loosen or clamp the lines when placed between them, substantially as herein set forth.

In testimony whereof I affix my signature in presence of two witnesses.

GEORGE M. CUSTER.

Witnesses:
HARVEY J. HUSTON,
HARRY DURHAM.